United States Patent [19]

Watanabe et al.

[11] Patent Number: 4,457,538
[45] Date of Patent: Jul. 3, 1984

[54] FRONT SEAT BELT RETRACTOR DISPOSING STRUCTURE

[75] Inventors: Hiroyuki Watanabe, Yasushi Tanaka; Ken Miura; all of Toyota, Japan

[73] Assignee: Toyota Jidosha Kogyo Kabushiki Kaisha, Aichi, Japan

[21] Appl. No.: 370,291

[22] Filed: Apr. 20, 1982

[30] Foreign Application Priority Data

Aug. 24, 1981 [JP] Japan .......................... 56-125075[U]

[51] Int. Cl.³ ............................................. B60R 21/10
[52] U.S. Cl. .................................. 280/801; 280/807; 297/204; 297/474
[58] Field of Search ............... 280/801, 807; 297/473, 297/481, 482, 474; 296/185, 203, 204, 205

[56] References Cited

U.S. PATENT DOCUMENTS

| 4,218,074 | 8/1980 | Crawford | 280/801 |
| 4,331,349 | 5/1982 | Funahashi | 280/801 |
| 4,400,015 | 8/1983 | Ryu | 297/481 |
| 4,402,545 | 9/1983 | Utsunomiya et al. | 296/204 |

Primary Examiner—Richard A. Bertsch
Attorney, Agent, or Firm—Parkhurst & Oliff

[57] ABSTRACT

A front seat belt retractor disposing structure which has a floor cross member formed in a hollow inverted U-shaped cross-section in such a manner that the lower opening makes contact with the floor of a vehicle under a rear seat along the transverse direction for containing a front seat belt retractor so that a front seat belt can be drawn externally. Thus, the front seat belt retractor disposing structure can provide sufficient rear seat passengers' accommodation and feet retention spaces by containing the retractor within the floor cross member.

13 Claims, 6 Drawing Figures

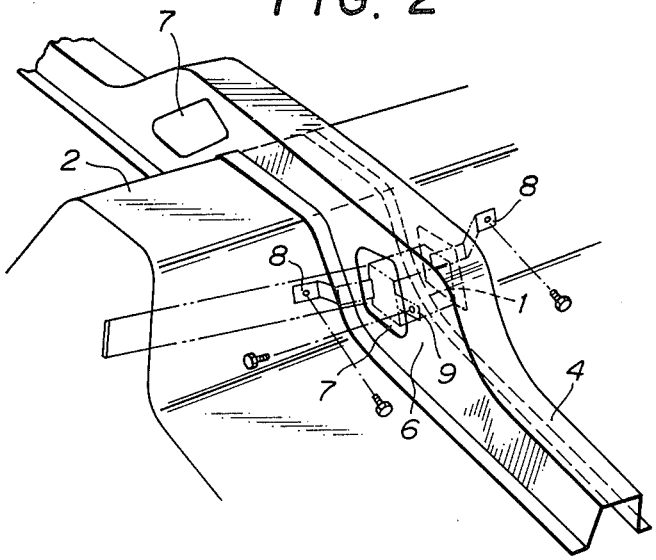
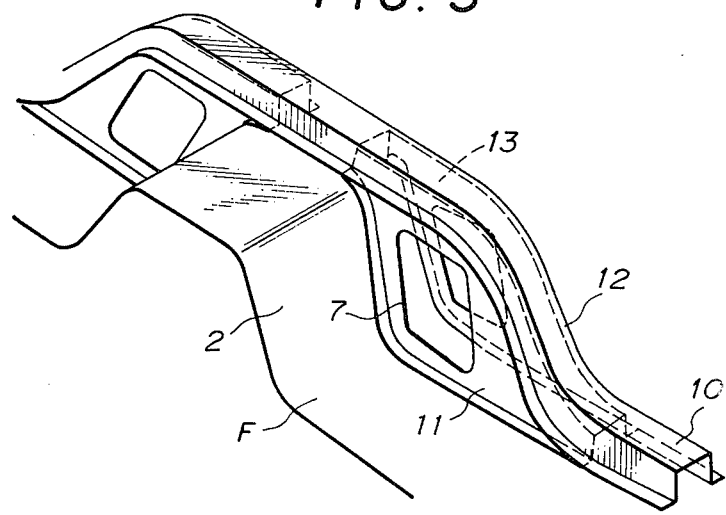

FRONT SEAT BELT RETRACTOR DISPOSING STRUCTURE

BACKGROUND OF THE INVENTION

This invention relates to a front seat belt retractor for a vehicle and, more particularly, to improvements in a front seat belt retractor disposing structure to an automotive body for securing sufficient rear seat passengers' accommodation space and their feet retention space in the vehicle.

A conventional front seat belt retractor 1 is, as shown in FIG. 6 mounted on the upper surface or the side surface of a front floor tunnel 2 and is thus projected toward a rear seat side. Accordingly, rear seat passengers' accommodation space and their feet retention space are insufficient in a vehicle, and hence it is difficult to obtain the rear seat passengers' comfortable sitting margin.

Further, a conventional front seat belt retractor is installed in a floor tunnel side so as to handle the front seat belt in a prior vehicle in which passengers' sitting position is lower than an ordinary automobile. This is an especially troublesome problem with narrow feet retention spaces at not only a rear central seat but both side seats.

SUMMARY OF THE INVENTION

Therefore, a primary object of this invention is to provide a front seat belt retractor disposing structure in which a front seat belt retractor is contained in a floor cross member to secure sufficient rear seat passengers' feet retention space in the rear compartment of a vehicle.

Another object of this invention is to provide a front seat belt retractor disposing structure which can also secure sufficient rear seat passengers' space to obtain a comfortable sitting margin.

Yet another object of this invention is to provide a front seat belt retractor disposing structure which can increase the installation space for a console box.

A further object of this invention is to provide a front seat belt retractor disposing structure which can ultilize the strength of the floor cross member for fastening a belt anchor to unnecessitate a special reinforcing member for fastening the belt anchor.

Still another of this invention is to provide a front seat belt retractor disposing structure in which the front seat belt retractor is not projected toward the rear seat side to gain comfortable passengers' sitting allowance in the rear compartment.

BRIEF DESCRIPTION OF THE DRAWINGS

The foregoing objects and other objects as well as the characteristic features of the invention will become more apparent and more readily understandable by the following description and the appended claims when read in conjunction with the accompanying drawings:

FIG. 2 is an enlarged perspective view of the front seat belt retractor disposing structure of the present invention;

FIG. 3 is a perspective view of the modified example of the floor cross member employed in the front seat belt retractor of the present invention;

DESCRIPTION OF THE PREFERRED EMBODIMENTS

Figure 1:
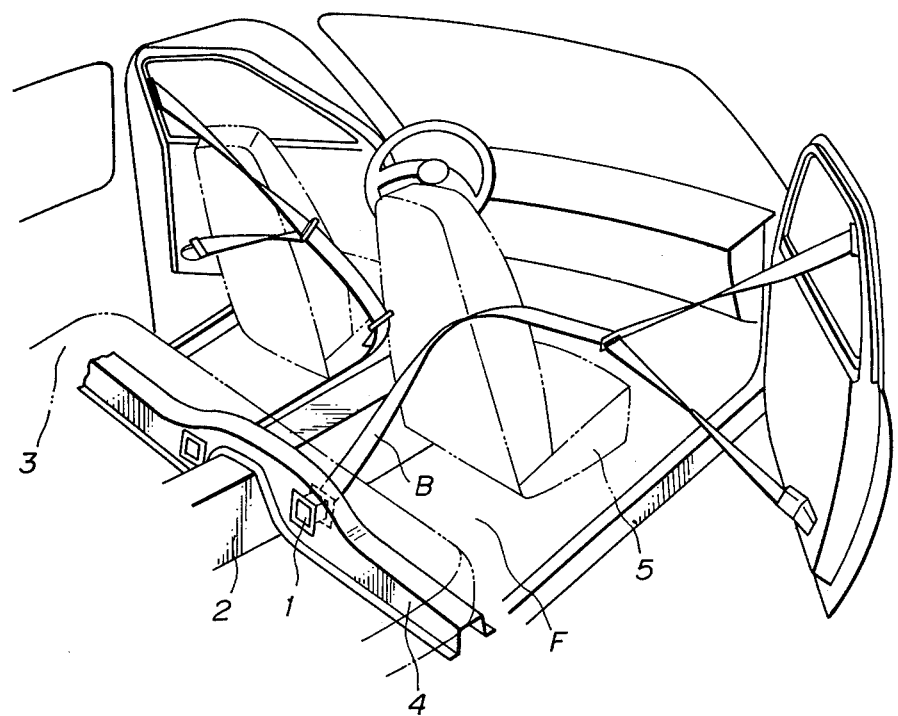
FIG. 1 is a perspective view of the interior of a vehicle which has a front seat belt retractor disposing structure constructed according to the present invention.

Referring now to the drawings, and particularly to FIG. 1, showing one preferred embodiment of the front seat belt retractor disposing structure of the present invention, in which like reference numerals designate the same parts in the following views, a front seat belt retractor 1 is disposed within a floor cross member 4 under a rear seat 3. A seat belt B is drawn out at one side end from the retractor 1 along the side surface of a floor tunnel 2 toward a front seat 5 side.

The floor cross member 4 is formed in a hollow inverted U-shaped cross-section in such a manner that the lower opening thereof makes contact with a floor F under the rear seat 3 along the transverse direction of a vehicle. As shown in FIG. 2, an opening 7 for retracting a front seat belt retractor is perforated at the front side surface 6 of the floor cross member 4.

The front seat belt retractor 1 is inserted through the opening 7 into the floor cross member 4. A seat belt drawing port is arranged toward the opening 7 side.

An anchoring member 8 is longitudinally projected on the longitudinal side of the front seat belt retractor 1 body to fasten the retractor 1 via bolts to the side surface of the floor tunnel 2. A flange 9 is protruded from the opposite side of the retractor 1 to the side on which the anchoring member 8 is provided. The front seat belt retractor 1 is firmly fastened in the floor cross member by fastening the flange 9 to the floor cross member 4 with bolts or the like.

The opening 7 is also perforated at the other side of the floor cross member 4 with respect to the floor tunnel 2. The one opening 7 contains the seat belt retractor 1 at the driver's seat side, and the other opening 7 contains the seat belt retractor 1 at the assistant driver's seat side.

It is noted that the foregoing description is directed to the front seat belt retractor 1 which is fastened to the side of the floor tunnel 2, but a flange may be formed at the peripheral edge of the longitudinal end of the retractor 1 and the retractor 1 may be fastened to the peripheral edge of the opening 7.

The seat belt B is drawn out from the drawing port of the retractor 1 through the opening 7 along the side surface of the floor tunnel 2 toward the front seat 5 side.

A cover may preferably be provided at the side of the floor tunnel 2 to form a seat belt guide passage. Thus, the seat belt drawn from the retractor 1 can be passed through the guide passage and can be led to the front seat side, and hence the seat belt B may be drawn without being exposed on the floor so as not to obstruct the external appearance and not to disturb the passengers' feet. FIG. 3 illustrates the modified example of the floor cross member employed in the front seat belt retractor disposing structure of the previous embodiment of the present invention. This floor cross member is composed of a sub floor cross member 10 and a reinforcing member 11 bonded to the cross member 10.

The sub floor cross member 10 is formed in an inverted U-shaped cross-section with a length corresponding to the width of a vehicle and is also formed with a rising part 12 which is perforated with a substantially rhombic or square opening of space with the surface of the floor F and the side surface of the floor tunnel 2 at an adequate position.

The reinforcing member 11 is formed in a hollow inverted U-shaped cross-section and is also formed in the same shape as the rhombic or square form of the space of the sub floor cross member 10. The reinforcing member 11 is engaged at the upper end face 13 and at one side surface within the sub floor cross member 10, is fastened at the lower end face to the floor F, and is arranged at the other side surface on the side surface of the floor tunel 2. An opening 7 is perforated at the reinforcing member 11. When the retractor 1 is inserted through the opening 7, it is contained within the floor cross member 4.

Since the floor cross member 4 is thus constructed, when the reinforcing member 11 is pressed, the retractor 1 can be simultaneously mounted within the reinforcing member 11, thereby improving the productivity.

Figure 4:
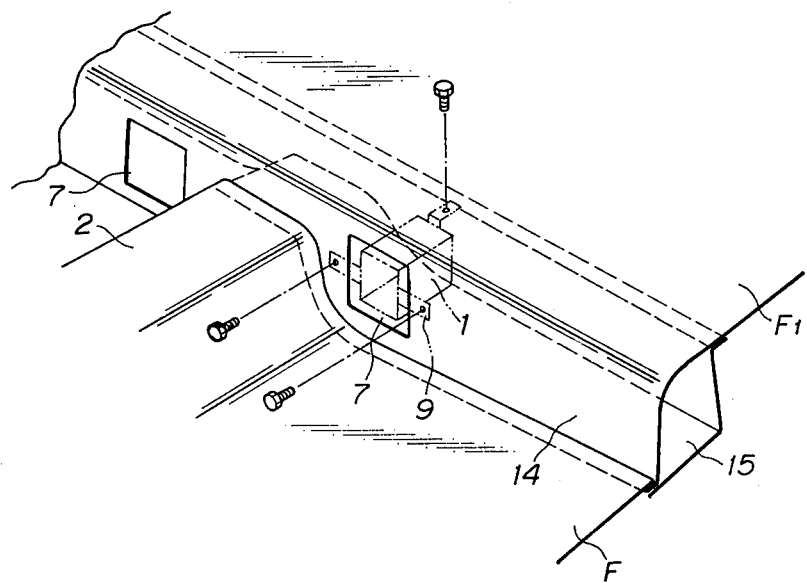
FIG. 4 is a perspective view of the further modified example of the floor cross member employed in the front seat belt retractor disposing structure of the present invention.

FIG. 4 depicts the further modified example of the floor cross member employed in the present invention. A floor cross member 15 is arranged on the lower surface of the floor. More particularly, the floor F has a rising side surface 14 under the rear seat to form a higher floor $F_1$. Thus, the substantially L-shaped floor cross member 15 is fastened in the transverse direction of a vehicle so as to form a hollow part with the face of the floor $F_1$ the rising side surface 14 on the lower surface of the floor $F_1$.

An opening 7 is perforated at the rising side surface 14 of the floor F at the floor cross member of this example. The retractor 1 is inserted through the opening 7, and is fixedly contained in the hollow part formed by the floor $F_1$ and the floor cross member 15.

It will be understood from the foregoing description that since the front seat belt retractor disposing structure of the present invention is thus constructed to comprise the floor cross member having an opening, through which the front seat belt retractor is inserted and is fastened within the floor cross member in such a manner that a front seat belt is drawn from a belt drawing port through the opening of the floor cross member toward the front seat side, it can secure sufficient rear seat sitting passengers' foot retention space by containing the front seat belt retractor within the floor cross member so as to obtain a comfortable passengers' sitting margin, can expand the installation space for a console box, and can utilize the strength of the floor cross member for fastening the belt anchor, thereby unnecessitating a special reinforcing member thereof.

Figure 5:
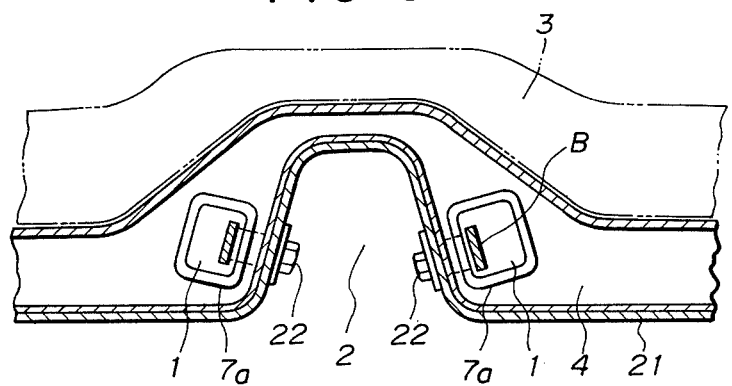
FIG. 5 is an enlarged cross sectional view of the further modified of the front seat belt retractor disposing structure of the present invention.
Figure 6:
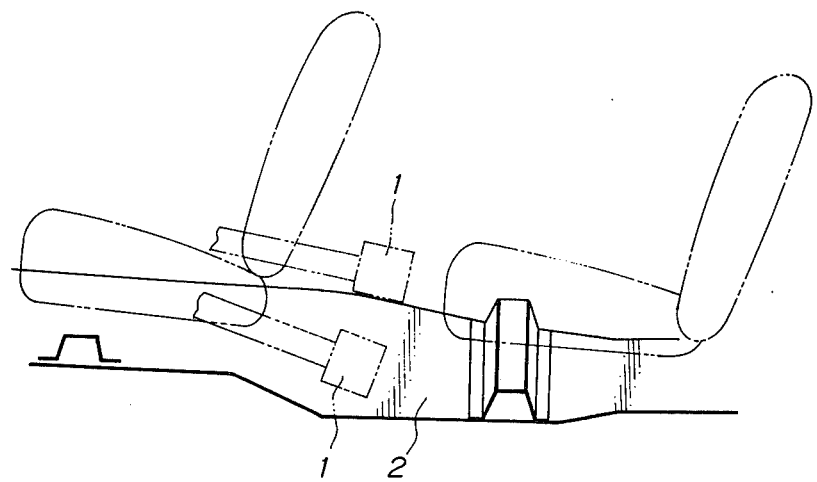
FIG. 6 is a schematic side view of the conventional front seat belt retractor disposing structure.

FIG. 5 illustrates another preferred embodiment of the front seat belt retractor disposing structure according to the present invention. A floor cross member 4 arranged under a rear seat 3 is perforated with openings 7a for associating the front seat belt retractor 1 at both front faces of the front seat sides thereof. Thus, the front seat belt retractor 1 is so contained within the floor cross member 4 through the opening 7a in such a manner that the seat belt drawing port is directed forwardly.

The retractor 1 thus contained in the floor cross member 4 is fastened via a floor member 21 to the side face of the floor tunnel 2 with bolts and nuts 22.

The opening 7a is perforated at both sides of the floor cross member 4 with respect to the floor tunnel 2. The one opening 7a contains the seat belt retractor 1 at the driver's seat side, and the other opening 7a contains the seat belt retractor 1 at the assistant driver's seat side.

It is noted that the retractor 1 may be completely contained within the floor cross member, or may also be disposed so that the retractor drawing port is located on substantially the same plane as the opening 7a.

It will be appreciated from the aforementioned description that since the front seat belt retractor disposing structure of the present invention is thus constructed to comprise the floor cross member disposed under a rear seat for containing a front seat belt retractor therein to allow the retractor to draw a seat belt toward the front seat side, it does not protrude the front seat belt retractor toward the rear seat side as the conventional one, hence can secure sufficient rear seat sitting passengers' accommodation space and their feet retention space to gain comfortable passengers' sitting allowance, can contain the front seat belt retractor within a center floor cross member to expand the installation space for a console box, and can utilize the strength of the center floor cross member for fastening the belt anchor to unnecessitate the reinforcing member therefor.

It will be understood that various changes in the details, materials, arrangements of parts and operation conditions which have been herein described and illustrated in order to explain the nature of the invention may be made by those skilled in the art within the principles and scope of the invention.

What is claimed is:

1. A front seat belt retractor disposing structure comprising:
    a center floor cross member having at least one opening under a rear seat, through which opening a front seat belt retractor is inserted and is fastened within said floor cross member, said retractor being disposed for a seat belt to be drawn through said opening to the front seat side, and one end of said seat belt being arranged through the center of the front seat.

2. The front seat belt retractor disposing structure according to claim 1, wherein said floor cross member is formed in a hollow inverted U-shaped cross-section in such a manner that the lower opening thereof makes contact with a floor of a vehicle under a rear seat along the traverse direction of the vehicle.

3. The front seat belt retractor disposing structure according to claim 1, wherein an anchoring member of the retractor is fastened to the floor tunnel and the cross member, thereby fastening the retractor into the cross member.

4. The front seat belt retractor disposing structure according to claim 1, wherein said floor cross member includes a sub floor cross member having an inverted U-shaped cross-section, a length corresponding to the width of a vehicle and a rising part formed with a predetermined space defined by the surface of the floor and the side surface of a floor tunnel, said sub floor cross member being coupled with a reinforcing member formed with a hollow inverted U-shaped cross-section, said reinforcing member having the same shape as the predetermined space of said sub floor cross member.

5. The front seat belt retractor disposing structure according to claim 1, wherein said opening is formed at the front surface of said cross member.

6. A front seat belt retractor disposing structure comprising:
a center floor cross member having at least one opening formed at the front surface thereof under a rear seat, through which opening a front seat belt retractor is inserted and is fastened within said floor cross member, said retractor being disposed for a seat belt to be drawn through said opening to the front seat side, and an anchoring member of the retractor fastening the retractor into said cross member, said floor cross member being formed in a hollow inverted U-shaped cross-section in such a manner that the lower opening thereof makes contact with a floor of a vehicle under a rear seat along the traverse direction of the vehicle.

7. The front seat belt retractor disposing structure according to claim 6, wherein one end of said front seat belt is arranged through the center of said front seat.

8. The front seat belt retractor disposing structure according to claim 6, wherein said floor cross member includes a sub floor cross member having a length corresponding to the width of a vehicle and a rising part formed with a predetermined space defined by the surface of the floor and the side surface of a floor tunnel, said sub floor cross member being coupled with a reinforcing member formed with a hollow inverted U-shaped cross-section, said reinforcing member having the same shape as the predetermined space of said sub floor cross member.

9. A front seat belt retractor disposing structure comprising:
a center floor cross member having openings formed at the front and rear surfaces thereof under a rear seat, through which front opening a front seat belt retractor is inserted and is fastened within said floor cross member, said retractor being disposed for a seat belt to be drawn through said front opening to the front seat side, said center floor cross member including a sub floor cross member formed in an inverted U-shaped cross-section with a length corresponding to the width of a vehicle and having a rising part formed with a predetermined space formed by the surface of the floor and the side surface of a floor tunnel, and a reinforcing member formed in a hollow inverted U-shaped cross-section and having the same shape as the opening of said sub floor cross member.

10. The front seat belt retractor disposing structure according to claim 9, wherein one end of said front seat belt is arranged through the center of said front seat.

11. The front seat belt retractor disposing structure according to claim 9, wherein said space is formed in a polygonal shape.

12. The front seat belt retractor disposing structure according to claim 9, wherein said reinforcing member is fastened at its lower end surface to the floor, and at its side surface of the floor tunnel.

13. The front seat belt retractor disposing structure according to claim 9, wherein a side surface of said retractor is formed with an anchoring member at the longitudinal rear end of the side surface on the floor tunnel side of said retractor, a flange is formed at the longitudinal end of the other side, said anchoring member is fastened to the side surface of the floor tunnel, and said flange is fastened to the peripheral edge of the opening of said floor cross member.

* * * * *